(12) United States Patent
Wittig

(10) Patent No.: US 8,082,078 B2
(45) Date of Patent: Dec. 20, 2011

(54) METHODS, SYSTEMS, AND COMPUTER PROGRAM PRODUCTS FOR STEERING TRAVEL LIMIT DETERMINATION FOR ELECTRIC POWER STEERING

(75) Inventor: William H. Wittig, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 925 days.

(21) Appl. No.: 12/099,470

(22) Filed: Apr. 8, 2008

(65) Prior Publication Data

US 2008/0281490 A1     Nov. 13, 2008

Related U.S. Application Data

(60) Provisional application No. 60/928,024, filed on May 7, 2007.

(51) Int. Cl.
*B62D 5/04* (2006.01)
*B62D 1/04* (2006.01)

(52) U.S. Cl. .......................................... 701/41; 180/446
(58) Field of Classification Search .................... 701/41
See application file for complete search history.

(56) References Cited

U.S. PATENT DOCUMENTS

| | | | |
|---|---|---|---|
| 4,153,133 A | | 5/1979 | Anderson |
| 5,086,859 A * | | 2/1992 | Takahashi et al. ............ 180/446 |
| 5,691,899 A * | | 11/1997 | Terasaki ........................... 701/38 |
| 6,367,576 B1 * | | 4/2002 | Rodenas et al. .............. 180/446 |
| 6,381,527 B1 * | | 4/2002 | Furumi et al. ................... 701/41 |
| 6,408,234 B1 * | | 6/2002 | Wittig .............................. 701/41 |
| 6,672,689 B1 * | | 1/2004 | Bauer ............................ 303/146 |
| 6,899,196 B2 | | 5/2005 | Husain et al. |
| 6,926,112 B2 | | 8/2005 | Husain et al. |
| 7,174,987 B2 | | 2/2007 | Husain |
| 7,241,028 B2 * | | 7/2007 | Hasumi .......................... 362/276 |
| 7,500,537 B2 * | | 3/2009 | Itoh ................................ 180/405 |
| 2004/0000814 A1 * | | 1/2004 | Bauer ............................ 303/146 |
| 2005/0243566 A1 * | | 11/2005 | Hasumi ......................... 362/465 |
| 2006/0042859 A1 * | | 3/2006 | Itoh ................................ 180/402 |
| 2007/0012506 A1 | | 1/2007 | Asada |
| 2009/0112403 A1 * | | 4/2009 | Wittig et al. ..................... 701/41 |
| 2009/0150026 A1 * | | 6/2009 | Wittig et al. ..................... 701/41 |

* cited by examiner

*Primary Examiner* — Shelley Chen

(74) *Attorney, Agent, or Firm* — Cantor Colburn LLP

(57) ABSTRACT

Methods, systems, and computer program products for steering travel limit determination for electric power steering. Exemplary embodiments include a method, computer program product and system incorporating the method, for implementing steering travel limit determination for electric power steering, including measuring end of travel positions of a handwheel of a vehicle, recording the end of travel positions, comparing the end of travel positions with current travel limit values and recording new travel limits with respect to the end of travel positions.

12 Claims, 3 Drawing Sheets

METHODS, SYSTEMS, AND COMPUTER PROGRAM PRODUCTS FOR STEERING TRAVEL LIMIT DETERMINATION FOR ELECTRIC POWER STEERING

Priority based on U.S. Provisional Patent Application, Ser. No. 60/928,024, filed May 7, 2007, and entitled, "Steering Travel Limit Determination For Electric Power Steering", is claimed.

FIELD OF THE INVENTION

This invention relates to automobile steering systems, and more particularly, to methods, systems, and computer program products for steering travel limit determination for electric power steering.

BACKGROUND

Steering equipment for assisting a driver to steer an automobile is well known in the art. In conventional steering assemblies, the operator controls the direction of the vehicle with the aid of a steering wheel. This wheel is mechanically connected, usually through a gear assembly to the road wheels. To aid the operator, many systems utilize an auxiliary system to generate a force that is transmitted to a steering gear assembly. The additional force reduces the effort required by the operator in changing the direction of the vehicle. Typically, this auxiliary force is generated by either a hydraulic drive or an electric motor.

Furthermore, electric power steering systems can utilize knowledge of travel limits of the steering system in order to reduce thermal loads and mechanical loads, as well as to determine a center position of the steering system. However, the limit values are typically unique to each vehicle and can be asymmetrical, thereby making it difficult to use apriori calibrations to set the limits.

Therefore, is it considered advantageous to provide a steering control system that provides steering travel limit determination.

SUMMARY

Disclosed herein is an exemplary method in a vehicle having a handwheel, the method including measuring end of travel positions of the handwheel, recording the end of travel positions, comparing the end of travel positions with current travel limit values and recording new travel limits with respect to the end of travel positions.

Further disclosed herein is a computer program product for implementing steering travel limit determination for electric power steering, the computer program product including instructions for causing a computer to implement a method, the method including measuring end of travel positions of a handwheel of a vehicle, recording the end of travel positions, comparing the end of travel positions with current travel limit values and recording new travel limits with respect to the end of travel positions.

Further disclosed herein is a system, including a controller having a process with instructions to measure end of travel positions of a handwheel of a vehicle, record the end of travel positions, compare the end of travel positions with current travel limit values and record new travel limits with respect to the end of travel positions.

The above-described and other features will be appreciated and understood by those skilled in the art from the following detailed description, drawings, and appended claims.

BRIEF DESCRIPTION OF THE DRAWINGS

Refer now to the figures, which are meant to be exemplary, not limiting, and wherein the like elements are numbered alike.

DETAILED DESCRIPTION

In exemplary embodiments, a steering travel limit determination method for electric power steering monitors the range of steering system travel during operation of the electric power steering system. The method further records unique values for the range of the steering system travel in non-volatile memory. Limits and checks are implemented to ensure that values selected for travel limits are reasonable with respect to operation of the steering system.

Figure 1:
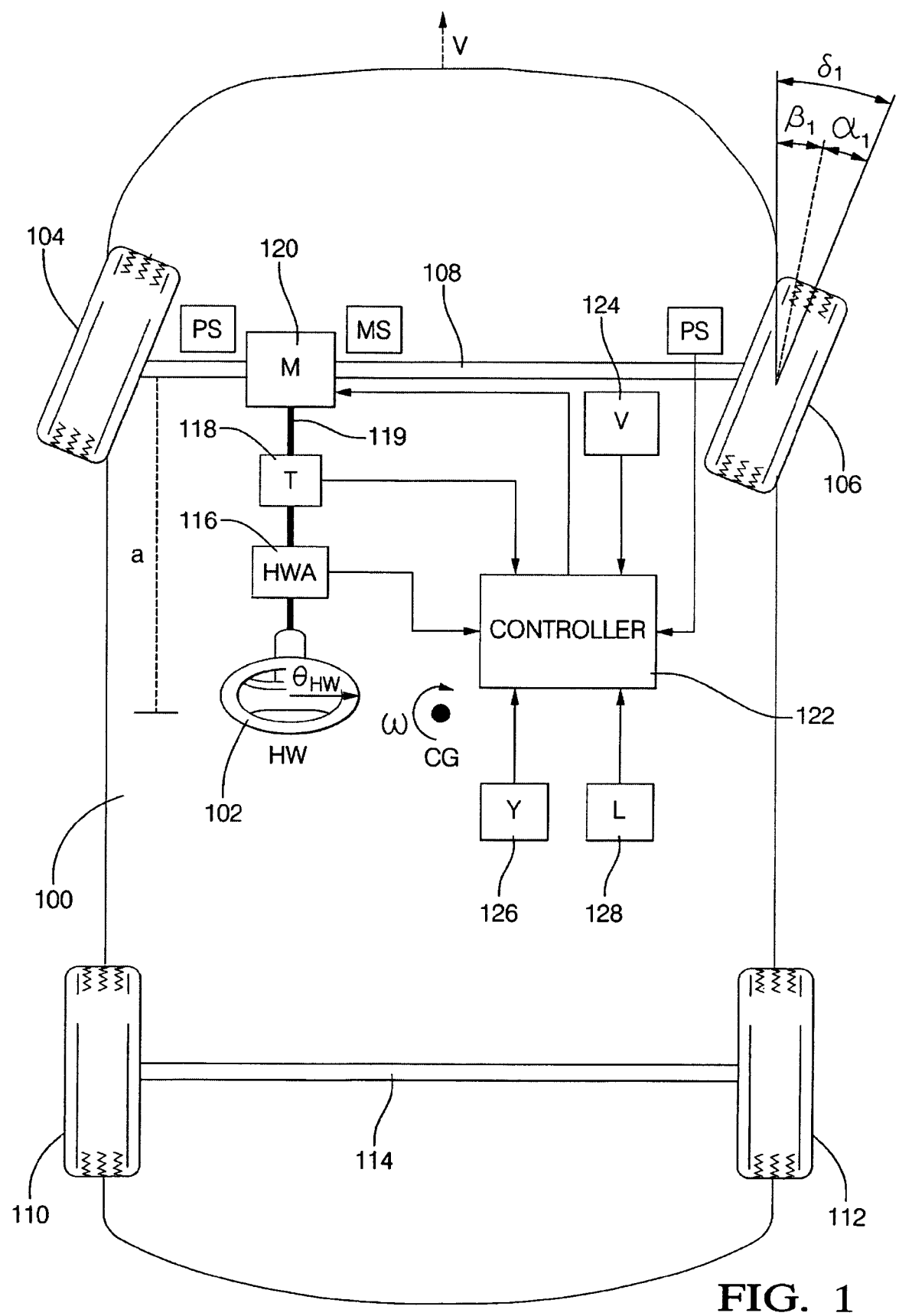
FIG. 1 illustrates a diagram of a vehicle upon which steering travel limit determination may be implemented in exemplary embodiments.

Turning now to the drawings in greater detail, FIG. 1 illustrates a diagram of a vehicle 100 upon which steering travel limit determination may be implemented in exemplary embodiments. The vehicle 100 of FIG. 1 includes a handwheel 102 for controlling the angle of a left front road wheel 104 and a right front road wheel 106 in an exemplary front wheel steering configuration. The left and right front road wheels 104 and 106 are coupled through a rack and pinion steering mechanism 108. The vehicle 100 also includes a left rear road wheel 110 and a right rear road wheel 112 coupled through a rear axle 114. In exemplary embodiments, when a driver of the vehicle 100 rotates the handwheel 102, the angular position of the handwheel 102 may be determined through a handwheel angle sensor (column position sensor) 116. The handwheel 102 and the rack and pinion steering mechanism 108 may be coupled through a steering shaft 118 and a steering actuator motor and gearing 120 (steering actuator). The steering actuator 120 may include an electric motor in a steering actuation system, such as AFS, EPS, SBW, ARS, or AWS. In exemplary embodiments, the steering actuator 120 is part of an EPS system. While the steering actuator 120 is depicted in FIG. 1 at the coupling junction between the steering shaft 118 and the rack and pinion steering mechanism 108, in exemplary embodiments the steering actuator 120 may be located at or distributed between the steering shaft 118 and the rack and pinion steering mechanism 108. Positional determinations of the steering actuator 120 may be determined through a motor position sensor 121 which may also be used to calculate the angular position of the handwheel ($\theta_{HW}$). In exemplary embodiments, the vehicle 100 also includes rack position sensors 109, 111 to determine the position of the rack and pinion steering mechanism 108 (e.g., the linear position of the rack).

In exemplary embodiments, the vehicle 100 also includes a controller 122, which receives input signals from the handwheel angle sensor 116, the motor position sensor 121, the rack position sensors 109, 111, and other sensors, including but not limited to, a vehicle speed sensor 124, a yaw rate sensor 126, a lateral acceleration sensor 128, etc. The controller 122 may generate output signals to the steering actuator 120. Although only a single controller 122 is depicted, it is understood by those skilled in the art that the controller 122 may be distributed through multiple control units within the vehicle 100. For example, there may be a local controller at the steering actuator 120 that receives vehicle information over a vehicle network from various smart sensors or a centralized control unit.

The vehicle sensors 109, 111, 116, 121, 124, 126, 128 depicted in FIG. 1 may include various types of technologies to produce input signals with or without additional signal conditioning and processing by the controller 122. The handwheel angle sensor 116 may be any type of sensor capable of generating an angular handwheel position ($\theta_{HW}$). For example, the handwheel angle sensor 116 may be a resolver, a rotational variable differential transformer (RVDT), an encoder, or a potentiometer. The motor position sensor 121 may similarly be a resolver, a RVDT, an encoder, or a potentiometer, and a combination of other sensor types. The position sensors 109, 111 may be a single or composite of multiple sensors on the rack and pinion steering mechanism 108 to determine the travel limits of the overall steering system. The position sensors 109, 111, the handwheel sensor 116 and the motor position sensor 121 may further include position switches as discussed further below.

The vehicle speed sensor 124 may be a single sensor or a composite of multiple sensors, which can be on the drive shaft, transmission and or each road wheel 104, 106, 110, 112. at each road wheel 104, 106, 110, and 112. In exemplary embodiments, the vehicle speed sensor 124 may utilize a magnetic pick-up to determine the speed (V) of the vehicle 100. The yaw rate sensor 126 may determine the rate of vehicle 100 yaw ($\omega$) with a gyroscope. The lateral acceleration sensor 128 may be an accelerometer. While vehicle sensors 109, 111, 116, 121, 124, 126, 128 are depicted as separate sensors, they may be merged into any combination of modules. Furthermore, the vehicle sensors 109, 111, 116, 121, 124, 126, 128 may be integrated in any combination with the steering actuator 120 or the controller 122. Multiple sensors may be provided for redundancy or improved accuracy. In exemplary embodiments, equivalent vehicle information provided by the vehicle sensors 109, 111, 116, 121, 124, 126, 128 may be extracted or synthesized from a combination of vehicle sensors, including other vehicle sensors not depicted in FIG. 1. While sensors 109, 111, 116, 121, 124, 126, 128 are depicted in FIG. 1, not all sensors are needed for all embodiments. For example, in some embodiments only a handwheel angle individually, a rack and pinion position measurement individually, or a motor position measurement individually may be used to perform travel limit determination.

Figure 2:
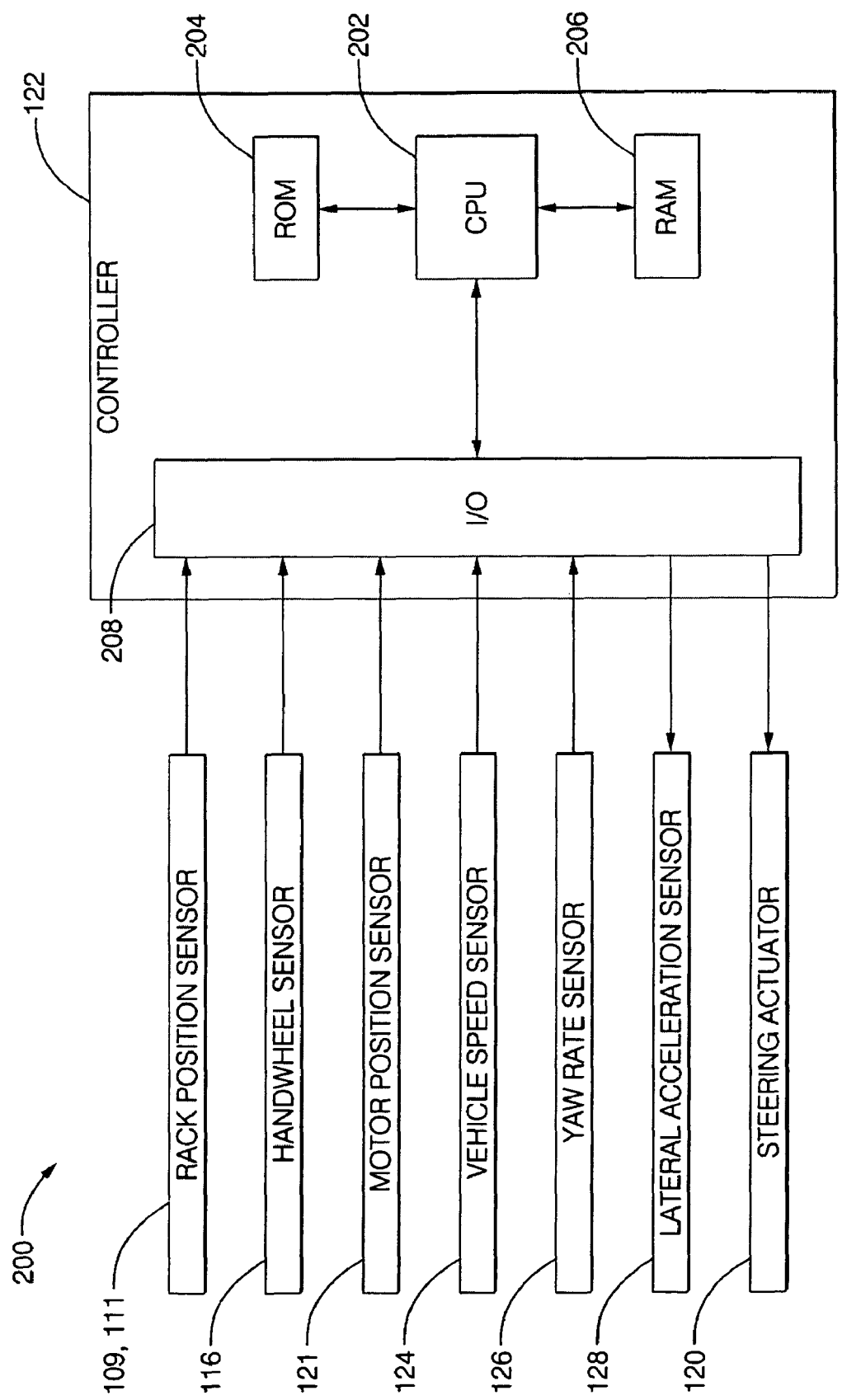
FIG. 2 illustrates a block diagram of a controller in accordance with exemplary embodiments.

Turning now to FIG. 2, a block diagram 200 of the controller 122 is depicted in accordance with exemplary embodiments. The controller 122 may collect various vehicle signals to control the steering actuator 120. The controller 122 may execute computer readable instructions for functions such as EPS control logic, vehicle stability logic, and travel limit determination logic, which may be embodied as computer program products. In exemplary embodiments, the controller 122 includes a central processing unit (CPU) 202, a read-only memory (ROM) 204 (e.g., non-volatile EEPROM), a volatile memory such as a random access memory (RAM) 206, and an I/O interface 208. The CPU 202 operably communicates with the ROM 204, the RAM 206, and the I/O interface 208. Computer readable media including the ROM 204 and the RAM 206 may be implemented using any of a number of known memory devices such as PROMs, EPROMs, EEPROMS, flash memory or any other electric, magnetic, optical or combination memory device capable of storing data, some of which represent executable instructions used by the CPU 202. In exemplary embodiments, the CPU 202 communicates via the I/O interface 208 with the rack position sensors 109, 111, which can include sensing the state of position switches disposed in the position sensors 109, 111. The CPU can further communicate via the I/O interface 208 with the handwheel angle sensor 116 (and a state of the position switches), the motor position sensor 121 (and a state of the position switches), the vehicle speed sensor 124, the yaw rate sensor 126, the lateral acceleration sensor 128, and the steering actuator 120. While vehicle sensors 109, 111, 116, 121, 124, 126, 128 are depicted as separate inputs to the I/O interface 208, the signals may be otherwise coupled, packetized, or encoded.

Exemplary embodiments are now described in reference to the handwheel 102 of the vehicle 100 of FIG. 1. As a driver of the vehicle 100 rotates the handwheel 102, creating a handwheel angle ($\theta_{HW}$) relative to the vehicle, a tire steer angle ($\delta_f$) is imparted upon the front wheels 104 and 106. The controller 122 may be used in conjunction with the steering actuator 120 to control the tire steer angle ($\delta_f$), keeping the angle within a set of upper and lower limits. In exemplary embodiments, the steering actuator 120 is an EPS motor used for driver assist and a travel limit determination function. In addition, the controller 122 can measure and record positional changes within the steering actuator 120. Furthermore, as the driver of the vehicle 100 rotates the handwheel 102 a resultant relative displacement is imparted on the rack and pinion steering mechanism 108. This displacement can be measured by the position sensors 109, 111 and recorded to the controller 122.

In exemplary embodiments, the vehicle sensors 109, 111, 116, 121, 124, 126, 128 can be implemented individually or in combination in any vehicle system in which knowledge of specific steering travel limits, which typically vary from vehicle to vehicle, enhance performance. For example, a determination of a true zero position of the handwheel 102 can be determined when a relative position sensor is used in conjunction with the handwheel angle sensor 116. Furthermore, in another example, "soft" travel limit stops (rack stops on the rack and pinion steering mechanism 108) can be implemented electronically via any of the sensors described herein. The controller 122 can measure travel limit stops via the position sensors and, in one implementation, signal the steering actuator 120 of the new soft travel limits. In still other examples, the vehicle sensors 109, 111, 116, 121, 124, 126, 128 can be implemented for parking and other autonomous steering methods.

In exemplary embodiments, the vehicle sensors 109, 111, 116, 121, 124, 126, 128 can be, implemented for overall vehicle 100 stabilization methods. For example, as a driver of the vehicle 100 rotates the handwheel 102, creating the handwheel angle ($\theta_{HW}$) relative to the vehicle 100, the tire steer angle ($\delta_f$) is imparted upon the front wheels 104 and 106, as discussed above. The lateral rotation of the front wheels 104 and 106 applies a lateral tire force on each wheel. As the vehicle yaws in response to rotating the front wheels 104 and 106, the portion of the road wheels 104 and 106 in contact with a travel surface (e.g., a road) may not align with the direction of travel of the vehicle. The actual change in lateral vehicle travel direction at the front of the vehicle 100 is referred to as a vehicle sideslip angle ($\beta_f$) or a vehicle slip angle. The difference between the vehicle sideslip angle ($\beta_f$) and the tire steer angle ($\delta_f$) is the tire slip angle ($\alpha_f$), which is expressed by the equation: $\alpha_f = \delta_f - \beta_f$. A rapid maneuver can create a larger tire slip angle ($\alpha_f$) in a positive or negative direction, resulting in a larger positive or negative tire lateral force.

To provide overall vehicle stability, travel limit determinations can be implemented with one or more of the vehicle sensors, such as position sensors 109, 111 as described above, the handwheel sensor 116 and the motor position sensors 121. For example, in an AFS system, the tire steer angle ($\delta_f$) can be the mechanical combination of two inputs, the handwheel angle ($\theta_{HW}$) and the AFS motor angle. In exemplary embodiments, the steering actuator 120 is an AFS motor used for VR control and a travel limit determination function. Therefore, for example, an AFS motor angle command can be bounded by measured travel limit quantities from the handwheel sensor 116 and the motor position sensor 121 to prevent commands beyond the mechanical capability of the system. In further exemplary embodiments, position data can be measured from the position sensors 109, 111 to provide further travel limit determinations to the controller 122. In exemplary embodiments, travel limit learning can be used to bound the commands in an AFS system to prevent running into the travel stops.

In exemplary embodiments, systems and methods herein can determine unique travel limits for each direction (i.e., clockwise (CW) and counter-clockwise (CCW)) of a steering system via position monitoring via the vehicle position sensors 109, 111, 116, 121. As such, a system wherein a position sensor is attached to the steering system via the handwheel 102, the steering actuator 120, and the rack and pinion steering mechanism 108, for example, via the vehicle position sensors 109, 111, 116, 121, the controller 122 can execute one or more algorithms to perform functions including, but not limited to: sensing or calculating angle of the handwheel 102; determining a zero reference point with respect to the handwheel 102 and determining a total possible travel CW and CCW from the reference point. In exemplary embodiments, determining the zero reference point can be determined by a relative sensor reference point when only the change in position is known, and by an absolute reference point when the position with respect to a zero reference is known explicitly and read from one of the vehicle sensors (e.g., handwheel sensor 116). In exemplary embodiments, determining the total possible travel CW and CCW from the reference point can be determined from actual angles measured, for example maximum (CW) measurements and minimum (CCW) measurements during usage of the steering system. In exemplary embodiments, determining the total possible travel CW and CCW from the reference point can be determined further if a particular measurement is less than the minimum or greater than the maximum. In such circumstances, the new measured values can become the new minimum and maximum, respectively.

In exemplary embodiments, the systems and methods described herein can further save data that has been measured by the vehicle sensors 109, 111, 116, 121, 124, 126, 128 across ignition cycles. As such, the ROM 204 (as non-volatile memory) and the controller 122 can be implemented to retain the measurement data. Furthermore, the controller 122 can include "keep-alive" power to maintain memory. In accordance with further exemplary embodiments, the controller 122 can include algorithms to implement error checking. For example, exemplary algorithms can determine minimum and maximum possible values for end of travel (EOT) limits (e.g., of the rack and pinion steering mechanism 108) from mechanical constraints of the steering geometry. Exemplary algorithms can further check the calculated limits against the EOT limit values. Furthermore, exemplary algorithms can provide methods for resetting the limits when the geometry changes (e.g. component replacement, steering alignment, etc.)

As discussed above, the position sensors 109, 111, the handwheel sensor 116 and the motor position sensor 121 can further include position switches. As such, in exemplary embodiments, the systems and methods described herein can determine unique travel limits for each direction (CW and CCW) of the steering system via limit switches. For example, a switch can be placed at each travel limit. For example, when the switch is closed on the handwheel sensor 116, the current handwheel angle $\theta_{HW}$ is determined to be the corresponding travel limit. In exemplary embodiments, the switches may be wired in parallel and the corresponding travel limit determined by the sign of the $\theta_{HW}$. A unique switch circuit may be used for each travel stop and the limit determined explicitly.

In exemplary embodiments, the systems and methods described herein can further determine unique travel limits for each direction (CW and CCW) of a steering system via monitoring a handwheel 102 torque-angle gradient. In an exemplary embodiment, the slope of the handwheel 102 torque (y axis) versus the handwheel angle, $\theta_{HW}$, (x axis) can be steeper when the steering system encounters a travel stop as compared to the slope when the steering system is constrained by an obstacle such as a curb due to the tire compliance. As such, by detecting the higher slope of the travel stop, the current handwheel 102 angle $\theta_{HW}$ is determined to be the corresponding travel limit.

Figure 3:
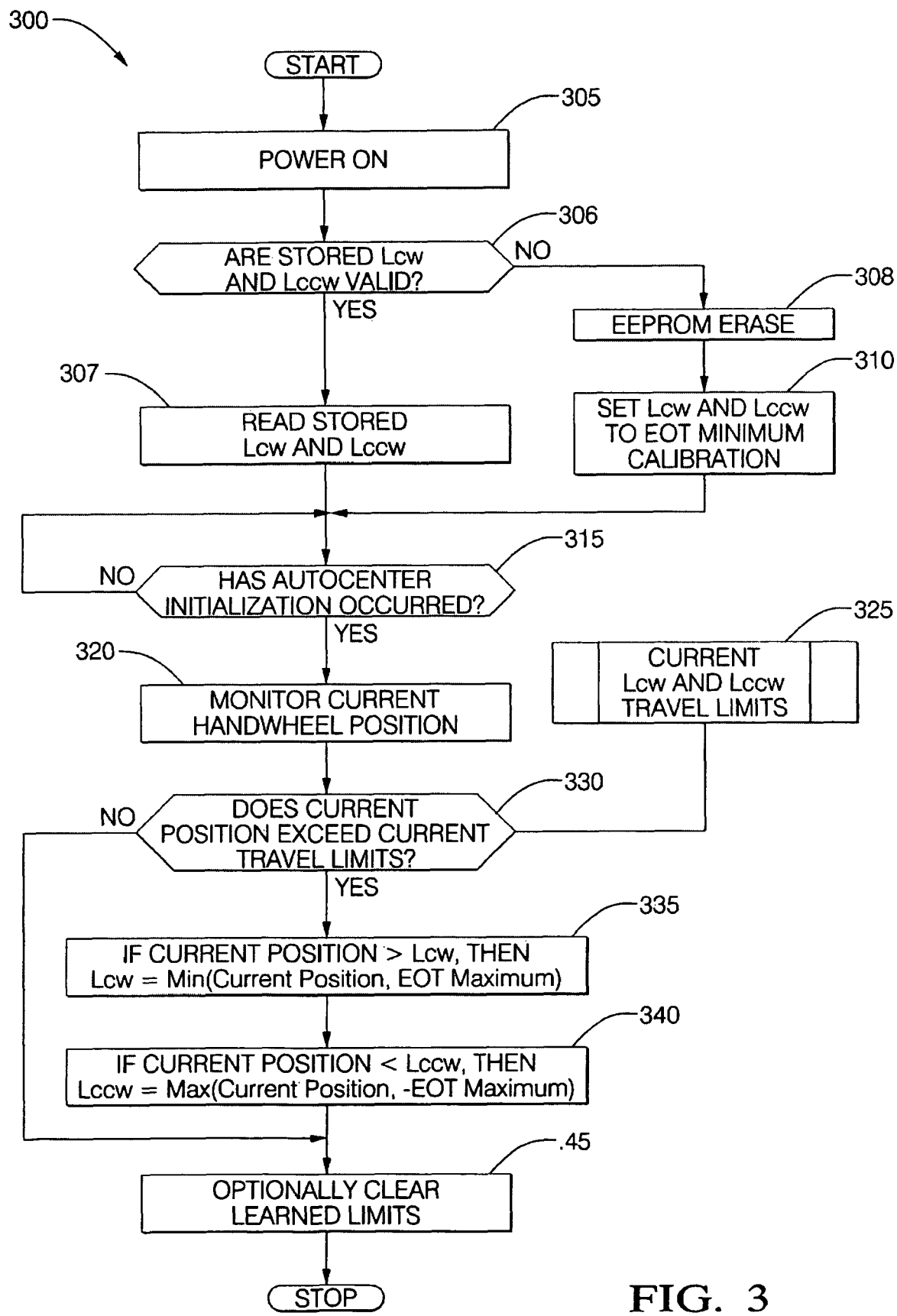
FIG. 3 illustrates a flow chart of a method for steering travel limit determination for electric power steering in accordance with exemplary embodiments.

It is appreciated that in accordance with exemplary embodiments, calibrations can be provided for the vehicle 100. For example, an EOT maximum, that is, a maximum allowable absolute value of the EOT travel limit, and an EOT minimum, that is, the minimum allowable absolute value of the EOT travel limit, can be defined. In addition, the controller 122, and alternatively the ROM 204 (e.g., EEPROM, etc.) can be programmed with variables such as Lcw, an EOT CW travel limit, and Lccw, an EOT CCW travel limit. FIG. 3 illustrates a flow chart of a method 300 for steering travel limit determination for electric power steering in accordance with exemplary embodiments.

At step 305, the steering system is powered on, which can correspond with an ignition cycle of the vehicle 100. In addition, at step 305, the controller 122 is initiated, which can include updating or erasing an EEPROM. At step 306, the previously stored limits are checked for validity. If they are not valid, the stored values are erased at step 308 and, At step 310, the variables, Lcw and Lccw are set to an EOT minimum calibration. If the stored values are determined to be valid at Step 306, the values are read at Step 307 and used in further calculations. At step 315, the method 300 determines whether or not an autocenter initialization has occurred, which determines an initial zero position of the handwheel 102. In an exemplary embodiment, the method 300 loops at step 315 until the autocenter initialization has occurred. Once autocenter initialization has occurred at step 315, at step 320 the current position of the handwheel 102 is measured. At step 330, the method 300 determines whether or not the current position exceeds any of the current travel limits, which is provided by the controller 122 at step 325 (e.g., current travel limits stored in an EEPROM, etc.).

If at step 330, travel limits have been exceeded, then at step 335, if the current position is greater than the value Lcw, then Lcw is set to be the minimum of the current position and the EOT maximum. At step 340, if the current position is less than the value Lccw, then Lccw is set to be the maximum of the current position and the negative of EOT maximum. At step 345, the controller 122 can enter a service state in which the controller clears the learned limits and sets a new EOT maximum.

It is appreciated that the controller 122 can be initialized with travel limit values at the end of line (EOL) of the manufacturing line. In one exemplary embodiment, the autocenter initialization algorithm can obtain an accurate initial center value if the controller 122 is programmed during a rolling alignment, in which the vehicle is moving above a preset velocity threshold. In further exemplary embodiments, if a rolling alignment is not implemented, that is, a static alignment is implemented, then other exemplary algorithms can be implemented to learn current positions upon execution. For example, the controller 122 can be calibrated by performing a full lock-to-lock steer after alignment without cycling ignition to initially place a set of travel limits into the vehicle (e.g., non-volatile ROM 204.)

The disclosed systems and methods can be embodied in the form of computer or controller implemented processes and apparatuses for practicing those processes. It can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the method. The method may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the method. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated. It is further appreciated that references to left and right as well as number used for logic can be interchanged and used otherwise in other implementations.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. In a vehicle having a handwheel, a method, comprising:
measuring end of travel positions of the handwheel;
recording the end of travel positions;
comparing the end of travel positions with current travel limit values;
recording new travel limits with respect to the end of travel positions;
determining if a current position of the handwheel exceeds current travel limits; and
in response to the current position being greater than a valid end of travel clockwise limit variable, setting the end of travel clockwise limit variable to a minimum of the current position and a predetermined end of travel maximum.

2. The method as claimed in claim 1 wherein measuring end of travel positions of the handwheel, comprises in response to a valid end of travel clockwise limit variable and a valid end of travel counterclockwise limit, reading a stored end of travel clockwise limit value as the end of travel clockwise limit variable and a stored end of travel counterclockwise limit value as the end of travel counterclockwise limit variable.

3. The method as claimed in claim 1 wherein measuring end of travel positions of the handwheel, comprises in response to an invalid end of travel clockwise limit variable and an invalid end of travel counterclockwise limit variable being valid, setting the end of travel clockwise limit variable and the end of travel counterclockwise limit variable as an end of travel minimum calibration.

4. The method as claimed in claim 1 further comprising performing an autocenter initialization on the handwheel.

5. The method as claimed in claim 1 further comprising in response to the current position being less than a valid end of travel counterclockwise limit, setting the end of travel counterclockwise limit variable to a maximum of the current position and a negative of a predetermined end of travel maximum.

6. A computer program product for implementing steering travel limit determination for electric power steering, the computer program product including instructions stored on a non-transitory computer-readable medium for causing a computer to implement a method, the method comprising:
measuring end of travel positions of the handwheel;
recording the end of travel positions;
comparing the end of travel positions with current travel limit values;
recording new travel limits with respect to the end of travel positions;
determining if a current position of the handwheel exceeds current travel limits; and
in response to the current position being greater than a valid end of travel clockwise limit variable, setting the end of travel clockwise limit variable to a minimum of the current position and a predetermined end of travel maximum.

7. The computer program product as claimed in claim 6 wherein measuring end of travel positions of the handwheel, comprises in response to a valid end of travel clockwise limit variable and a valid end of travel counterclockwise limit, reading a stored end of travel clockwise limit value as the end of travel clockwise limit variable and a stored end of travel counterclockwise limit value as the end of travel counterclockwise limit variable.

8. The computer program product as claimed in claim 6 wherein measuring end of travel positions of the handwheel, comprises in response to an invalid end of travel clockwise limit variable and an invalid end of travel counterclockwise limit variable being valid, setting the end of travel clockwise limit variable and the end of travel counterclockwise limit variable as an end of travel minimum calibration.

9. The computer program product as claimed in claim 6 wherein the method further comprises performing an autocenter initialization on the handwheel.

10. The computer program product as claimed in claim 6 wherein the method further comprises in response to the current position being less than a valid end of travel counterclockwise limit, setting the end of travel counterclockwise limit variable to a maximum of the current position and a negative of a predetermined end of travel maximum.

11. A system, comprising:
a controller having a process with instructions to:
measure end of travel positions of a handwheel of a vehicle;
record the end of travel positions;
compare the end of travel positions with current travel limit values;

record new travel limits with respect to the end of travel positions;

in response to a current position being greater than a valid end of travel clockwise limit variable, set the end of travel clockwise limit variable to a minimum of the current position and a predetermined end of travel maximum; and in response to the current position being less than a valid end of travel counterclockwise limit, set the end of travel counterclockwise limit variable to a maximum of the current position and a negative of a predetermined end of travel maximum.

12. The system as claimed in claim 11 wherein measuring the end of travel positions of the handwheel of the vehicle comprises:

in response to a valid end of travel clockwise limit variable and a valid end of travel counterclockwise limit, reading a stored end of travel clockwise limit value as the end of travel clockwise limit variable and a stored end of travel counterclockwise limit value as the end of travel counterclockwise limit variable; and in response to an invalid end of travel clockwise limit variable and an invalid end of travel counterclockwise limit variable being valid, setting the end of travel clockwise limit variable and the end of travel counterclockwise limit variable as an end of travel minimum calibration.

* * * * *